(12) United States Patent
Cypher et al.

(10) Patent No.: US 7,774,552 B1
(45) Date of Patent: Aug. 10, 2010

(54) PREVENTING STORE STARVATION IN A SYSTEM THAT SUPPORTS MARKED COHERENCE

(75) Inventors: Robert E. Cypher, Saratoga, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 863 days.

(21) Appl. No.: 11/700,703

(22) Filed: Jan. 30, 2007

(51) Int. Cl.
  *G06F 12/00* (2006.01)
(52) U.S. Cl. ............... 711/141; 711/144; 711/E12.026
(58) Field of Classification Search ........................ None
  See application file for complete search history.

(56) References Cited

U.S. PATENT DOCUMENTS 7,089,374 B2 * 8/2006 Tremblay et al. ........... 711/145
7,549,025 B2 * 6/2009 Cypher et al. ............... 711/141
7,676,636 B2 * 3/2010 Cypher et al. ............... 711/141
2008/0091866 A1 * 4/2008 Cox et al. .................... 710/243

* cited by examiner

*Primary Examiner*—Reginald G Bragdon
*Assistant Examiner*—Baboucarr Faal
(74) *Attorney, Agent, or Firm*—Park, Vaughan & Fleming LLP; Anthony P. Jones

(57) ABSTRACT

One embodiment of the present invention provides a system that prevents store starvation in a computer system that supports marked coherence. The system starts by receiving a store instruction to be executed. The system then determines whether a cache line to which the store is directed is load-marked. If so, the system delays the store operation and asserts a store-requested flag in the metadata for the cache line, wherein when the store-requested flag is asserted, no subsequent load-marks can be placed on the cache line. Then, when all of the load-marks have been removed from the cache line, the system completes the store operation.

24 Claims, 14 Drawing Sheets

PREVENTING STORE STARVATION IN A SYSTEM THAT SUPPORTS MARKED COHERENCE

BACKGROUND

1. Field of the Invention

The present invention relates to the design of computer systems. More specifically, the present invention relates to a technique for preventing store starvation in a computer system that supports marked coherence.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help to reduce the number of accesses to memory. However, when a memory operation, such as a load, generates a cache miss, the subsequent access to level-two (L2) cache or memory can require dozens or hundreds of clock cycles to complete, during which time the processor is typically idle, performing no useful work.

One way to mitigate this problem is to speculatively execute subsequent instructions (including loads) during cache misses. Specifically, the processor does not wait for loads that generate cache misses to complete, but instead speculatively performs subsequent loads. Consequently, a large number of loads can be speculatively performed out of program order. Eventually, the processor completes the earlier loads, and if the speculative execution is successful, commits the speculative loads to the architectural state of the processor.

Some existing speculative-execution techniques use dedicated hardware structures which maintain the addresses of speculative loads while snooping invalidations to detect if any of the speculatively-loaded cache lines is invalidated. These existing techniques will "fail" a speculative load if such an invalidation is detected. Unfortunately, these existing techniques require dedicated hardware resources that do not scale well for a large number of speculative loads.

Another technique uses metadata in the L1 data cache to indicate if a thread has speculatively loaded the cache line. (See U.S. Pat. No. 7,089,374, entitled, "Selectively Unmarking Load-Marked Cache Lines during Transactional Program Execution," by inventors Marc Tremblay and Shailender Chaudhry.) This technique "fails" a speculative load if the corresponding speculatively-loaded cache line is invalidated or replaced from the L1 data cache. Unfortunately, because such invalidations and replacements occur more frequently than common coherence conflicts, they cause a significant number of failed speculative loads. These failed speculative loads consume a disproportionate amount of memory bandwidth and reduce the performance of non-speculative loads.

Some processor designers have suggested allowing threads to place "load marks" on cache lines that have been speculatively loaded. While the cache line is load-marked, no other thread is permitted to store to the cache line. However, other threads are allowed to continue loading from and load-marking the cache line. Hence, multiple threads can read from the cache line and each of these threads can prevent other threads from storing to the cache line. For more details on load-marking cache lines, see "Facilitating Load Reordering through Cache Line Marking" by the same inventors as the instant application, having Ser. No. 11/591,225, and filing date TO BE ASSIGNED.

Unfortunately, a problem called "store starvation" can arise when threads place load-marks on a cache line and the threads never simultaneously clear all of their load-marks from the cache line. Because the presence of any load-mark on a cache line prevents other threads from storing to the cache line, no thread will ever be able to store to the cache line. In this situation, the threads that attempt to store will never be able to store and will consequently suffer store starvation.

Hence, what is needed is a method and apparatus that facilitates marking cache lines without the above-described problem.

SUMMARY

One embodiment of the present invention provides a system that prevents store starvation in a computer system that supports marked coherence. The system starts by receiving a store instruction to be executed. The system then determines whether a cache line to which the store is directed is load-marked. If so, the system delays the store operation and asserts a store-requested flag in the metadata for the cache line, wherein when the store-requested flag is asserted, no subsequent load-marks can be placed on the cache line. Then, when all of the load-marks have been removed from the cache line, the system completes the store operation.

In a variation on this embodiment, when asserting the store-requested flag, the system first obtains a writeable copy of the cache line.

In a variation of this embodiment, the system determines if another thread has already asserted the store-requested flag and, if so, the system delays the store operation.

In a variation of this embodiment, if the thread is prevented from setting the store-requested flag, the system uses a forward-progress mechanism to allow the thread to proceed with a store in round-robin fashion with the other threads.

In a variation of this embodiment, when determining whether the cache line to which the store is directed is load-marked, the system receives a copy of the cache line along with metadata associated with the cache line, wherein the metadata includes prior load-marks and the store-requested flag.

In a variation of this embodiment, when determining whether the cache line to which the store is directed is load-marked, the system determines whether at least one other thread has placed a load-mark on the cache line, wherein when such a load-mark has been placed on a cache line, the thread attempting to store to the cache line cannot perform any stores.

In a variation of this embodiment, the system clears a load-mark when the thread that placed the load-mark has completed one or more load operations to the cache line.

In a variation of this embodiment, the system clears the store-requested flag when the store has completed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a memory system which facilitates performing load and store operations out of program order. To accomplish this without violating a conventional memory model such as Sequential Consistency (SC) or Total-Store-Order (TSO), embodiments of the present invention add a load-mark and a store-mark in metadata corresponding to each cache line, wherein the load-mark and the store-mark can be propagated to all levels of the memory hierarchy, including all caches and main memory.

When a cache line is load-marked by a thread, no other threads are permitted to store values to the cache line. On the other hand, when a cache line is store-marked by a thread, no other threads are permitted to load the value from or store a value to the cache line.

Because one or more threads can place load-marks on the cache line in such a manner that the load-marks on the cache line never completely clear, load-marking can prevent subsequent stores from completing, thereby causing "store starvation." Hence, in embodiments of the present invention, a thread that needs to store a value to the cache line can assert a "store-requested" flag associated with the cache line to prevent store starvation.

Computer System

Figure 1:
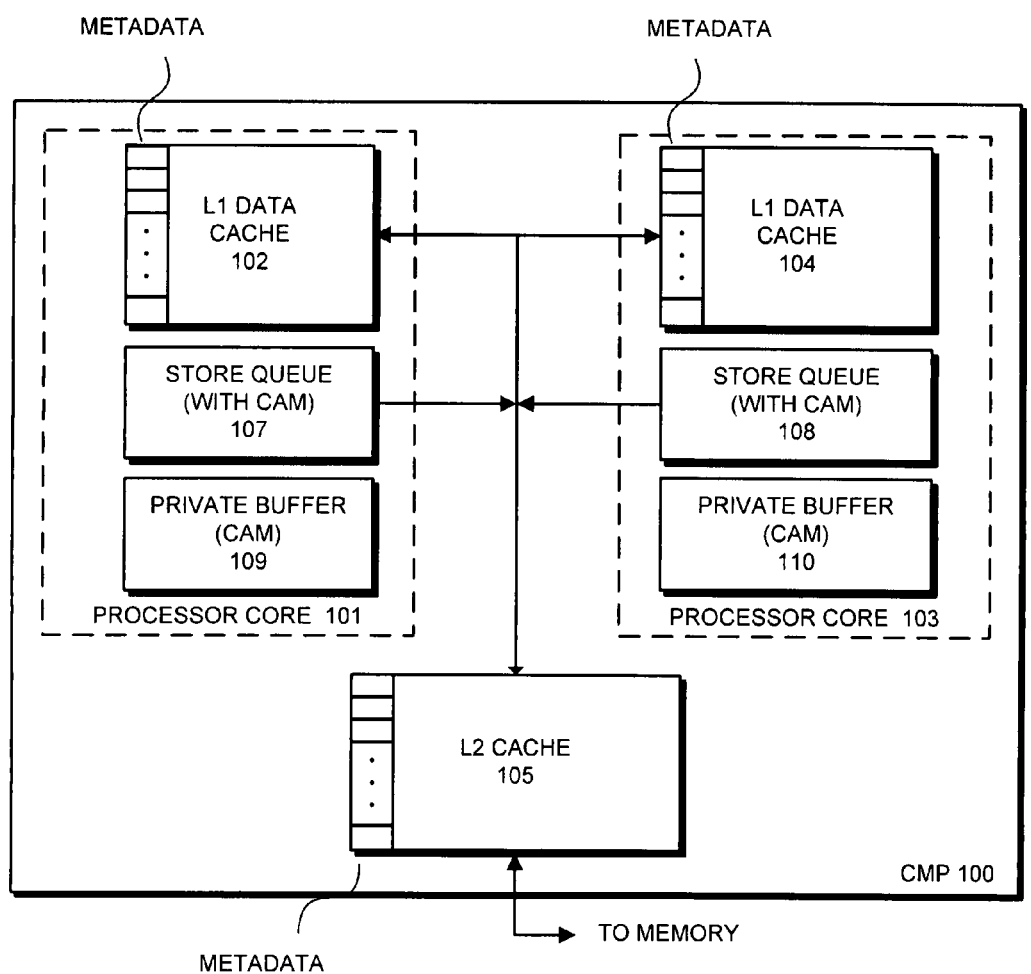
FIG. 1 illustrates an exemplary Chip Multi-Processor (CMP) system in accordance with an embodiment of the present invention.

FIG. 1 illustrates an exemplary Chip Multi-Processor (CMP) system 100 in accordance with an embodiment of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation, processor core 101 first performs a lookup for a corresponding cache line in L1 data cache 102. If the lookup generates a miss in L1 data cache 102, processor core 101 creates an entry for the store in store queue 107 and sends a corresponding fetch for the store to L2 cache 105. If the lookup generates a hit in the L1 data cache 102, processor core 101 creates an entry for the store in store queue 107.

During a subsequent load operation, processor core 101 uses a CAM structure to perform a lookup in store queue 107 to locate completed but not-yet-retired stores to the same address that are logically earlier in program order. For each byte being read by the load operation, if such a corresponding store exists, the load operation obtains its value from store queue 107 rather than from the memory subsystem.

Processor cores 101 and 103 additionally include private buffers 109 and 110, which maintain copies of addresses of load-marked and store-marked cache lines to facilitate efficient lookups of these addresses. When a thread needs to load from or store to a cache line, that thread first checks its private buffer to determine if the thread has already load-marked or store-marked the cache line.

In addition, cache lines contained in L1 data caches 102 and 104, L2 cache 105, and in the memory (not shown) can include load-marks, store-marks, and a store-requested flag in metadata associated with the cache line. When a cache line is load-marked by a thread, no other threads are permitted to store to the cache line, thereby preventing another thread from overwriting a value in the cache line. On the other hand, when a cache line is store-marked by a thread, the store-mark prevents another thread from loading the value from or storing a value to the cache line, thereby providing the store-marking thread with exclusive access to the cache line. We refer to the process of placing such marks on a cache line as either "load-marking" or "store-marking" the cache line. Both types of marking are described in more detail in the following sections of this disclosure.

A thread can set the store-requested flag in the metadata for a cache line to request that the system allow a store to the cache line to complete. When set, the store-requested flag prevents other threads from placing load-marks on the cache line. Hence, when all outstanding load-marks have cleared from the cache line, the thread that set the store-requested flag can complete the store.

When the store-requested flag is asserted by a thread for a cache line, the system must propagate the asserted store-requested flag to other threads (as described in detail with respect to FIGS. 7A-7C).

Note that a load-mark prevents any other thread from writing to the cache line but not from reading from the cache line, so multiple threads can place load-marks in the metadata for a cache line (i.e., multiple threads can be reading from the cache line simultaneously). Hence, in one embodiment of the present invention, each cache line's metadata includes a "reader count" value that keeps track of how many threads have placed load-marks on the cache line. When multiple threads have load-marked the cache line, other threads are prevented from writing to the cache line until all of the threads have removed their load-marks.

In addition, when a thread has placed a load-mark on a cache line, the thread can perform any number of loads from the cache line. In other words, as long as a load-mark is set on the cache line, the marking thread may freely load the value from the cache line. The store-mark functions in the same way for stores to the cache line.

Load-Marking

The Load-Mark Request Operation

Figure 2A:
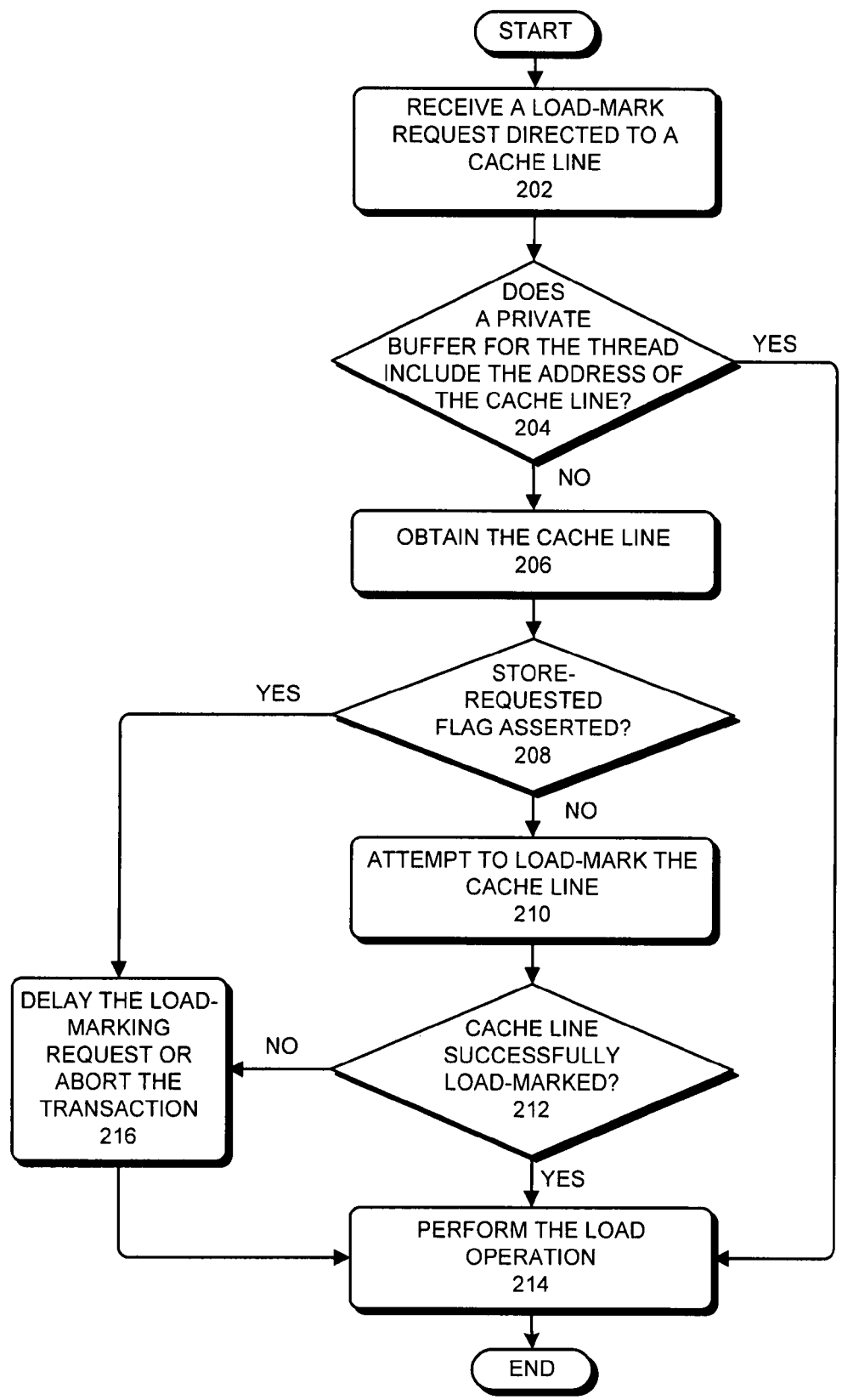
FIG. 2A presents a flowchart illustrating the process of performing a load-mark request operation in accordance with an embodiment of the present invention.

FIG. 2A presents a flowchart illustrating the process of performing a load-mark request operation in accordance with an embodiment of the present invention. Note that the load-mark request includes two operations; the load-marking operation and the load operation. When a load-mark request is handled, the system first attempts the load-marking operation. Upon successfully concluding the load-marking operation, the system automatically returns the cache line, thereby completing the load operation.

The process starts when the system receives a load-mark request from a thread, wherein the load-mark request is directed to a cache line (step 202). Next, the system checks a private buffer associated with the thread to determine whether the thread has already load-marked the cache line (step 204). Specifically, the system performs a lookup in the thread's private buffer based on the address of the load operation to locate a corresponding address for a load-marked cache line. If the private buffer contains a corresponding address, the thread has already load-marked the cache line and the thread can proceed with the load operation (step 214).

If the private buffer does not contain the corresponding address, the thread has not yet load-marked the cache line. In this case, the system then obtains the cache line (step 206). The system next determines if the store-requested flag is asserted in the cache line's metadata (step 208). If so, another thread is waiting to complete a store to the cache line. No load-marks can be placed on the cache line while another thread has the store-requested flag asserted. Hence, the load-marking operation is retried after a delay. In one embodiment of the present invention, the load-mark request is retried a predetermined number of times, and if the load-mark request remains unsuccessful, the transaction is aborted (step 216).

Otherwise, the system attempts to load-mark the copy of the cache line in the local cache (step 210). If load-marking is successful (step 212), the system performs the load operation (step 214). Otherwise, if the load-marking is unsuccessful, the system retries the load-mark request after a delay. In one embodiment of the present invention, the load-mark request is retried a predetermined number of times, and if the load-mark request remains unsuccessful, the transaction is aborted (step 216).

Figure 2B:
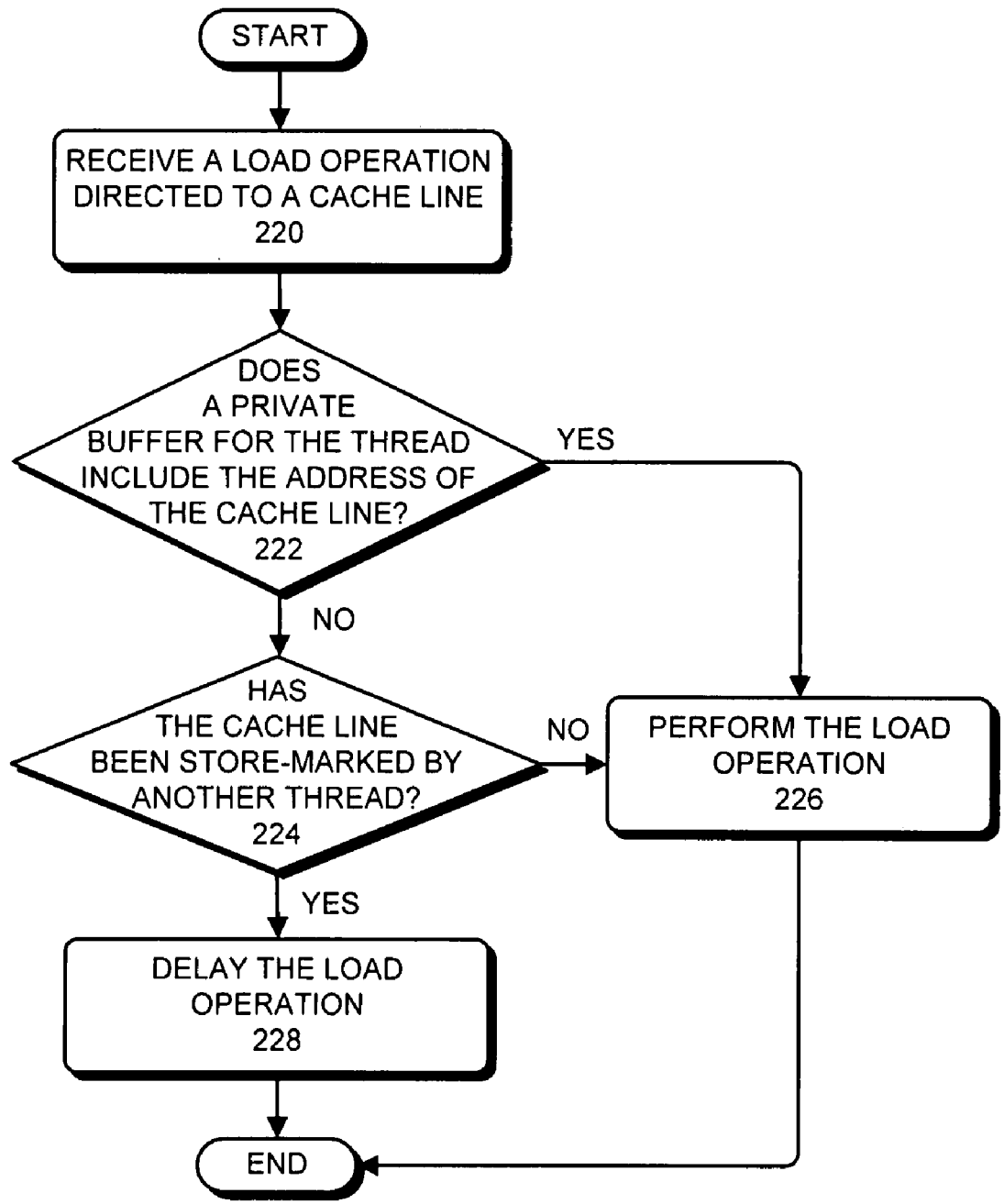
FIG. 2B presents a flowchart illustrating the process of performing a load operation without load-marking the cache line in accordance with an embodiment of the present invention.

FIG. 2B presents a flowchart illustrating the process of performing a load operation without load-marking the cache line in accordance with an embodiment of the present invention. The process starts when the system receives a load operation from a thread, wherein the load operation is directed to a cache line (step 220).

Next, the system checks a private buffer associated with the thread to determine whether the thread has already load-marked the cache line (step 222). Specifically, the system performs a lookup in the thread's private buffer based on the address of the load operation to locate a corresponding address for a load-marked cache line. If the private buffer contains a corresponding address, the thread has already load-marked the cache line and the system performs the load operation (step 226).

If cache line's address is not in the private buffer, the system determines if the cache line has been store-marked by another thread (step 224). If so, the thread cannot load the cache line and the load operation is retried after a delay (step 228). Otherwise, the system performs the load operation (step 226).

Attempting to Load-Mark the Cache Line

Figure 3:
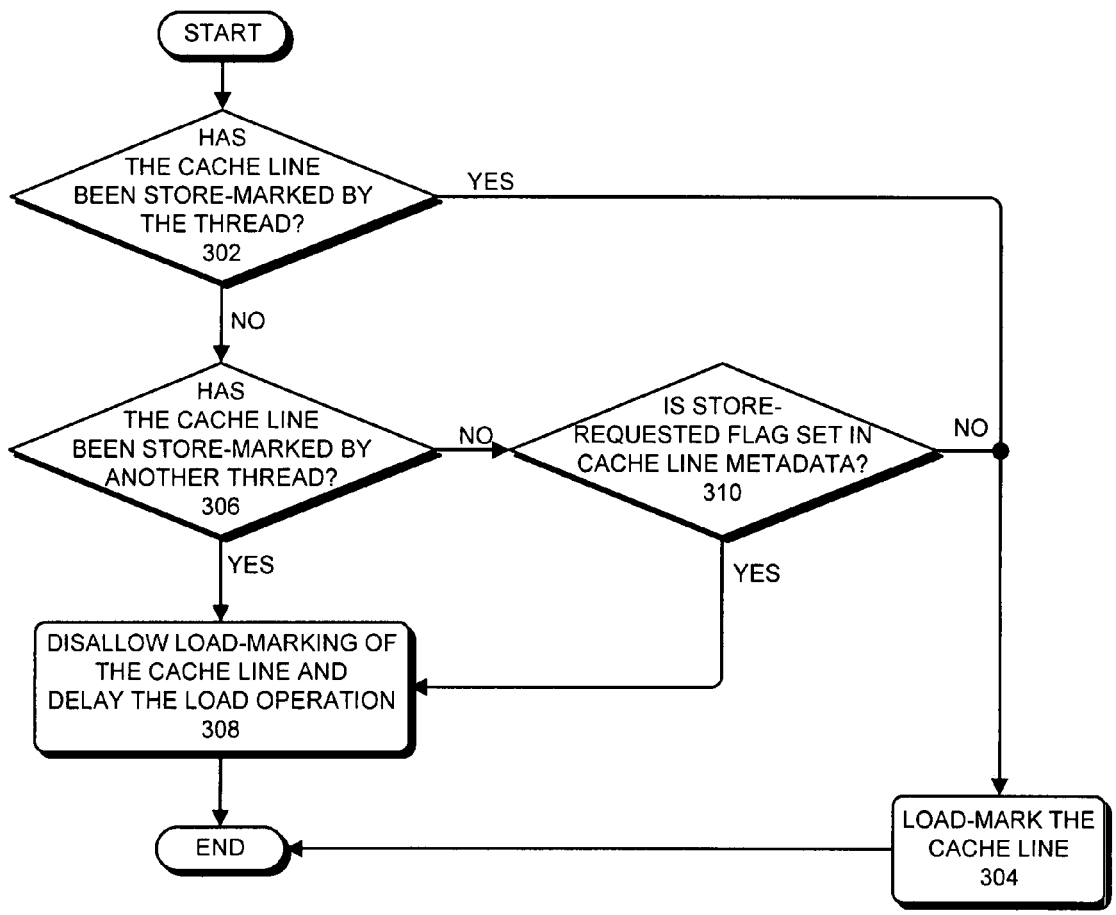
FIG. 3 presents a flowchart illustrating the process of attempting to load-mark the cache line in accordance with an embodiment of the present invention.

FIG. 3 presents a flowchart illustrating the process of attempting to load-mark the cache line in accordance with an embodiment of the present invention. During this process, the system first determines whether the cache line has been store-marked by the thread (step 302). Specifically, the system checks a store-mark buffer which maintains addresses of cache lines which have been store-marked by the thread to see if the address of the cache line exists in the store-mark buffer.

If the cache line has been store-marked by the thread, no other thread is permitted to load-mark the cache line (because of the exclusive property of store-marks). However, the thread may itself place a load-mark on a cache line that the thread has already store-marked. Hence, in this case, the system load-marks the cache line (step 304).

On the other hand, if the system determines that the cache line has not been store-marked by the thread, the system next determines if the cache line has been store-marked by another thread (step 306). If so, the thread cannot load-mark the cache line and the load operation is delayed (step 308).

On the other hand, if the system determines that the cache line has not been store-marked by the thread, the system determines if the store-requested flag is set in the cache line's metadata (step 310). If so, another thread is waiting to complete a store to the cache line. No load-marks may be placed on the cache line while another thread has the store-requested flag asserted. Hence, the load operation is retried after a delay (step 308). Otherwise, the system proceeds to load-mark the cache line for the thread (step 304).

Figure 4A:
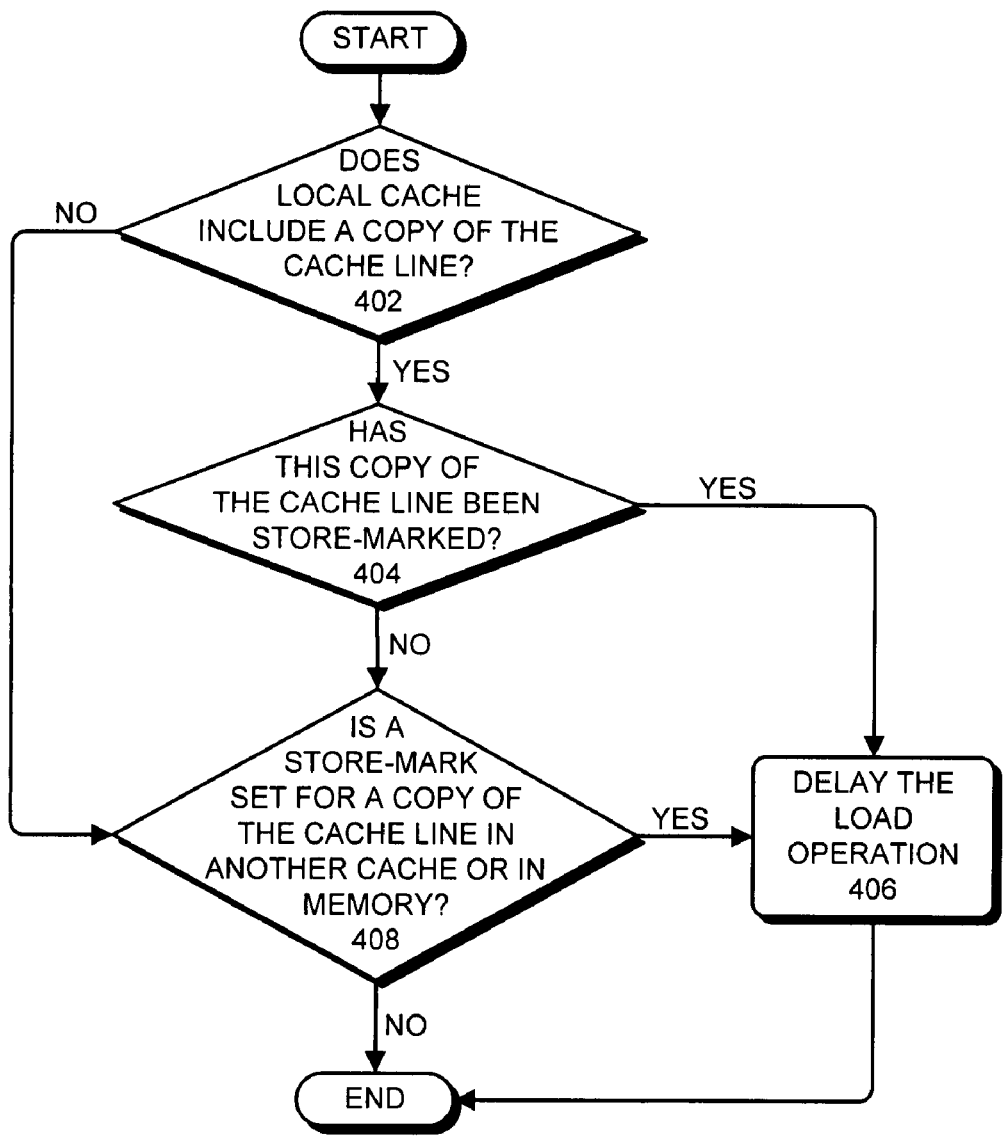
FIG. 4A presents a flowchart illustrating the process of determining whether the cache line has been store-marked by another thread in accordance with an embodiment of the present invention.

FIG. 4A presents a flowchart illustrating the process of determining whether the cache line has been store-marked by another thread in accordance with an embodiment of the present invention. During this process, system first checks in the thread's local cache for a copy of the cache line (step 402). If the system finds a copy of the cache line in the thread's local cache, the system examines the store-mark in the copy of the cache line to determine whether the cache line has been store-marked by another thread (step 404). If so, the cache line cannot be load-marked and the load operation is delayed (step 406).

On the other hand, if there is no valid copy of the cache line in the local cache, the system determines whether the store-mark has been set in another copy of the cache line which exists in another cache or in memory (step 408). If so, the cache line has been store-marked by another thread, which means the cache line cannot be load-marked, and the load operation is delayed (step 406).

Load-Marking a Cache Line

Figure 4B:
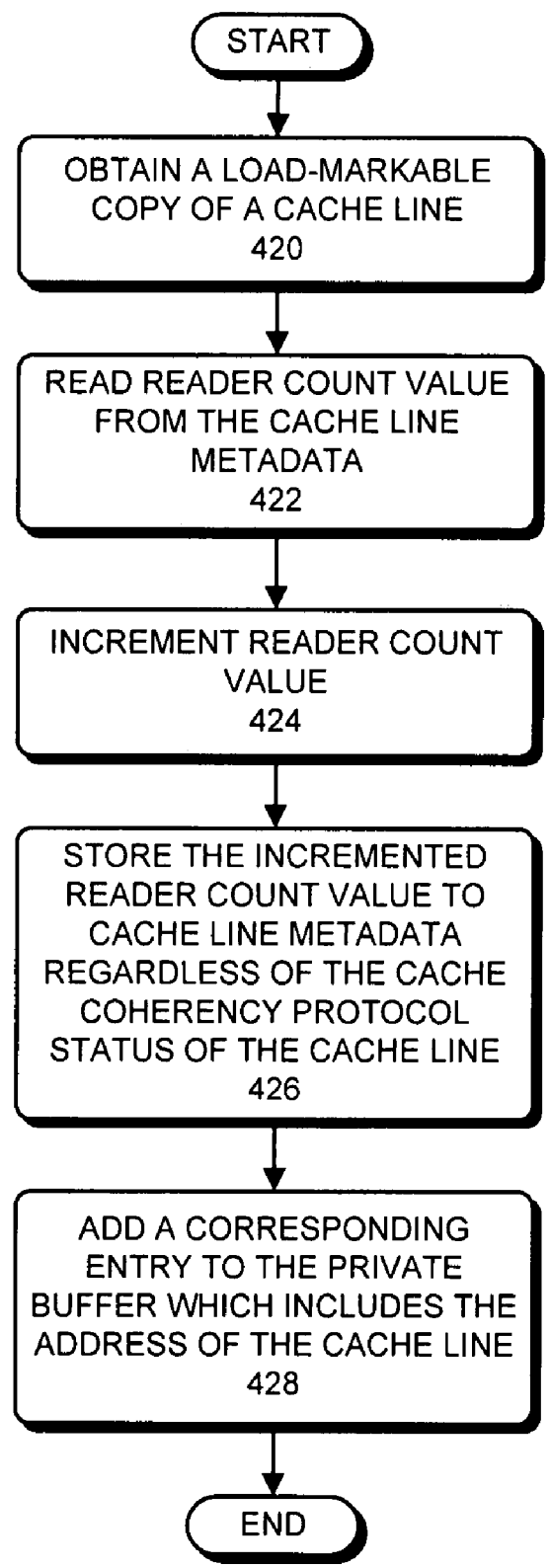
FIG. 4B presents a flowchart illustrating the process of load-marking a cache line in accordance with an embodiment of the present invention.

FIG. 4B presents a flowchart illustrating the process of load-marking a cache line in accordance with an embodiment of the present invention. The process starts with the system obtaining a copy of the cache line that can be load-marked (i.e., there are no store-marks or store-requested flag set on the cache line) (step 420).

Next, the system reads the reader count value from the cache line's metadata (step 422) and increments the reader count value (step 424). The system then stores the incremented reader count value back to the metadata for the cache line regardless of the valid cache coherency protocol state of the cache line (step 426). In other words, the system writes the metadata to the local copy of the cache line without obtaining write access to the cache line. For example, the system can update the metadata for a cache line when the cache line is in the shared (S) state without first placing the cache line in the modified (M) state. Finally, the system adds a corresponding entry to the private buffer for the thread which includes the address of the cache line (step 428). Note that this entry remains in the private buffer until subsequent changes are made to the state of the cache line, such as removing the load-mark.

After a thread either commits or fails a set of loads that are directed to a cache line which was load-marked by the thread, the system removes the thread's load-mark from the cache line by decrementing the reader count value in the metadata for the cache line. (Note that the reader count value is decremented regardless of the valid cache coherency protocol status of the cache line.) In addition to decrementing the reader count value, the thread removes the address of the cache line from the thread's private buffer.

Store-Marking

The Store-Marking Operation

Figure 5A:
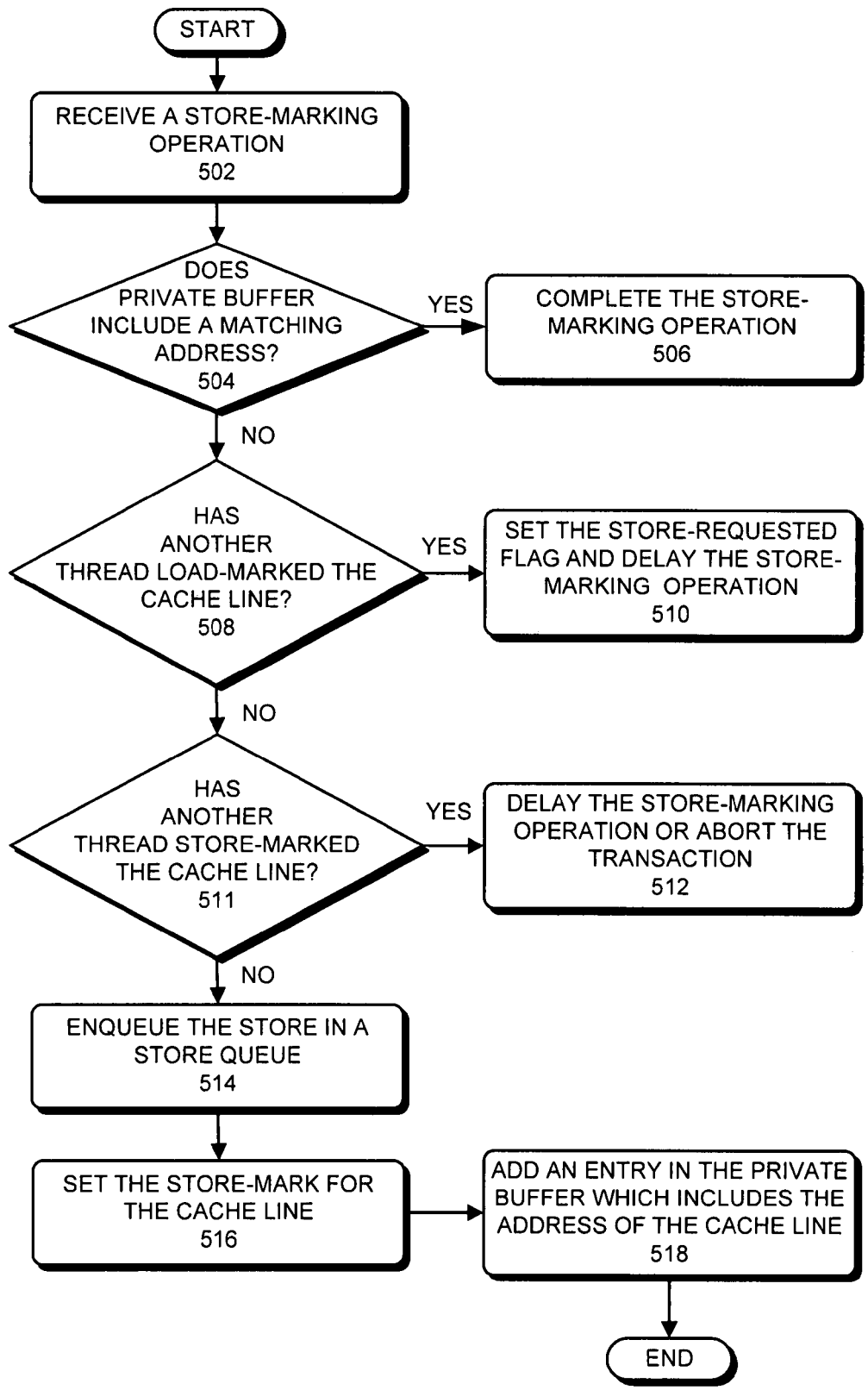
FIG. 5A presents a flowchart illustrating the process of performing a store-marking operation in accordance with an embodiment of the present invention.

FIG. 5A presents a flowchart illustrating the process of performing a store-marking operation in accordance with an embodiment of the present invention. The system first receives a store-marking operation which is directed to a cache line (step 502).

Next, the system checks the thread's private buffer 109 to determine whether the thread has already store-marked the cache line (step 504). Specifically, the system performs a lookup in the thread's private buffer based on the address of the memory reference to locate a corresponding address for a store-marked cache line. If the private buffer contains a corresponding address, the thread completes the store-marking operation (step 506).

If, however, the private buffer does not contain a matching address, the system determines whether the cache line has been load-marked by another thread (step 508). During this process, system first checks in the thread's local cache for a copy of the cache line. If the system finds a copy of the cache line, the system examines the load-mark to determine whether the cache line has been load-marked by another thread. In order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the thread asserts the store-requested flag for the cache line and delays the store-marking operation (step 510).

If no other thread has load-marked the cache line, the system determines whether the cache line has been store-marked by another thread (step 511). During this process, system first checks in the thread's local cache for a copy of the cache line. If the system finds a copy of the cache line, the system examines the store-mark to determine whether the cache line has been store-marked by another thread. If the store-mark in the copy of the cache line is not set, the system determines whether the store-mark has been set in another copy of the cache line which exists in another cache or in memory. If a store-mark is set in either location, the store-marking operation is delayed and retried. In one embodiment of the present invention, the store-marking operation is retried a predetermined number of times, and if the store-marking operation continues to be unsuccessful, the transaction is aborted (step 512).

Note that the system can use a cache-coherence mechanism to determine whether another cache or the memory holds a store-marked or load-marked copy of the cache line. This can involve sending an exclusive access request for the cache line to the other caches. If successful, the exclusive access request returns the cache line including store-mark status and the load-mark reader count. In one embodiment of the present invention, if the cache line has been store-marked in another cache, the system receives a NACK signal from the other cache which causes the request to fail, in which case the memory operation can be retried. In this embodiment, however, if the system does not receive a NACK signal, the system can then obtain exclusive (writable) access to that cache line.

Note that in order to perform a memory operation, it may be necessary to use the cache coherence protocol to obtain a copy of the cache line in a suitable state in the local cache. For example, if the memory operation is a load, it may be necessary to obtain a copy of the cache line in the shared (S), exclusive (E), owned (O), or modified (M) state. Similarly, if the memory operation is a store, it may be necessary to obtain a copy of the cache line in the E or M state (and if the cache line is in the E state, it may be necessary to change the cache line to the M state upon performing the store). If the cache coherence protocol is used to obtain a copy of the cache line in the E or M state, the request for this copy may differ from the exclusive access request mentioned in the preceding description. This is because the thread performing the store has already placed a store mark on the cache line, and thus the request should not receive a NACK signal.

If a store-mark or load-mark is not set in another cache or in memory, the system enqueues the store operation in store queue 107 (step 514). The system then sets the store-mark for the cache line (step 516) and adds the address of the cache line to the private buffer (step 518). Note that this entry remains in the private buffer until subsequent changes are made to the state of the cache line, such as removing the store-mark.

In one embodiment of the present invention, when a thread performs one or more stores to a store-marked cache line, the last of the stores can include a flag indicating that the store-mark should be cleared. When such a flag is encountered, the system releases the store-marked cache line by unsetting the store-mark in a copy of the cache line in its local cache, and additionally removing the address of the cache line from its private buffer.

In one embodiment of the present invention, a thread selectively places store-marks on cache lines. In other words, the thread may reorder some stores and not reorder other stores, in which case the thread store-marks on cache lines associated with stores that are reordered, but does not have to store-mark cache lines associated with stores that are not reordered and that are not part of a transaction.

Figure 5B:
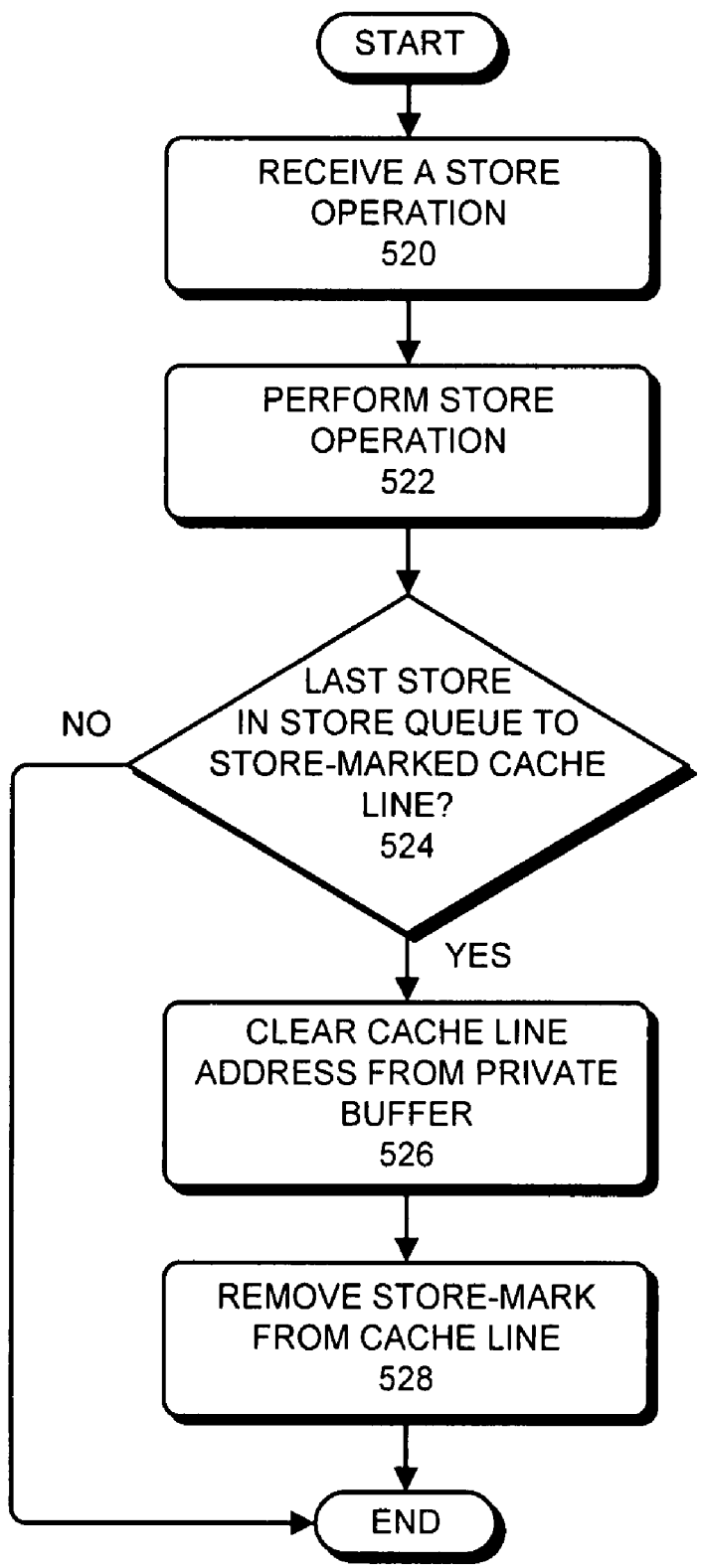
FIG. 5B presents a flowchart illustrating the process of performing a store operation for a cache line that has been store-marked in accordance with an embodiment of the present invention.

FIG. 5B presents a flowchart illustrating the process of performing a store operation for a cache line that has been store-marked in accordance with an embodiment of the present invention. The system first receives a store operation for a thread which is directed to a cache line from the store queue (step 520) and performs the store operation (step 522).

The system next determines if the store operation was the last store operation in the store queue to a store-marked cache line (step 524). If the store operation was the last store operation, the system clears the address of the store-marked cache line from the private buffer (step 526), removes the store-mark from the cache line (step 528), and clears the store requested flag if it is set.

Figure 5C:
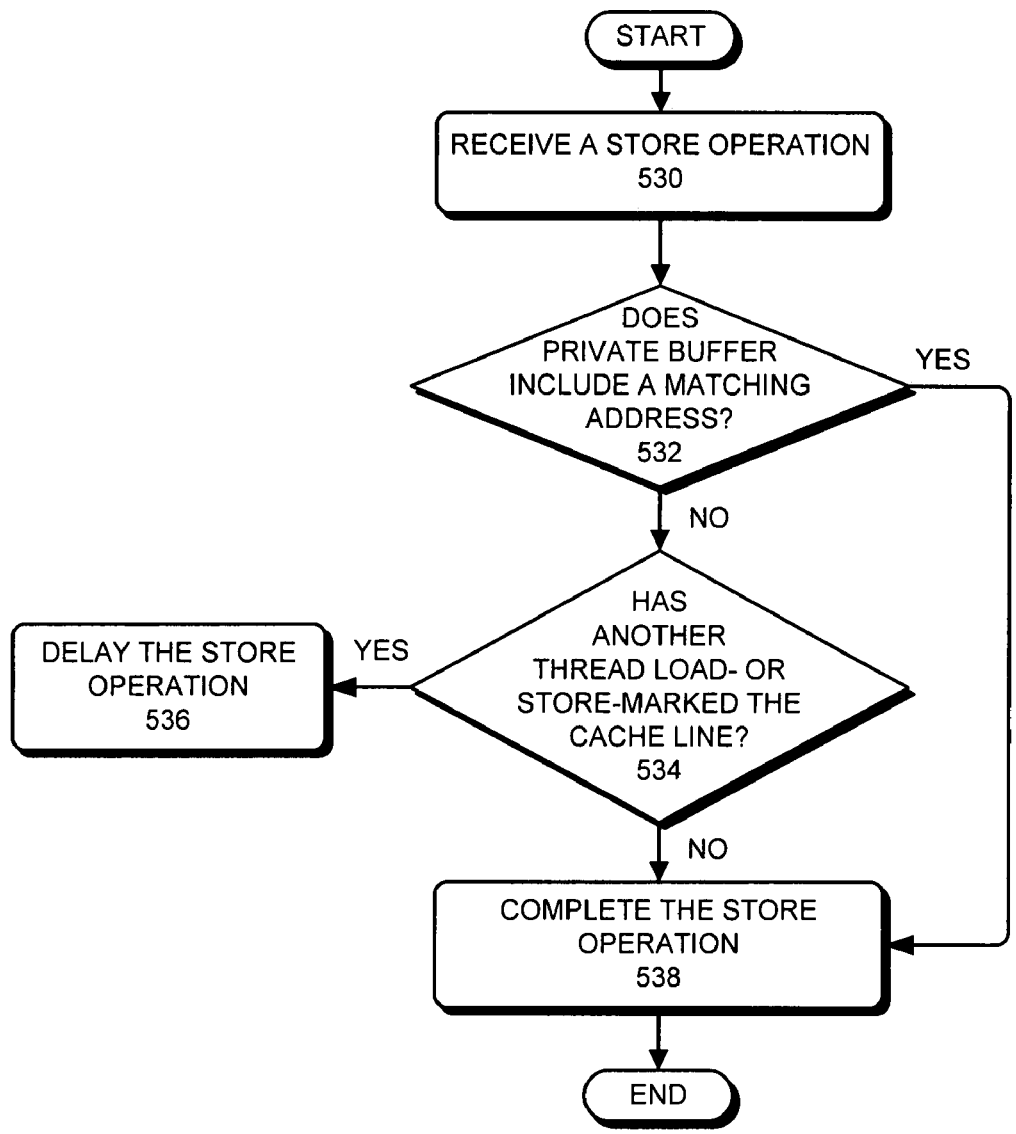
FIG. 5C presents a flowchart illustrating the process of performing a store operation for a cache line that has not been store-marked in accordance with an embodiment of the present invention.

FIG. 5C presents a flowchart illustrating the process of performing a store operation for a cache line that has not been store-marked in accordance with an embodiment of the present invention. The system first receives a store operation for a thread from the store queue which is directed to a cache line (step 530). For the purposes of illustration, we assume that the store operation was the oldest store operation in the store queue and that the store operation has not been re-ordered with respect to other store operations.

Next, the system checks the thread's private buffer 109 to determine whether the thread has already store-marked the cache line (step 532). Specifically, the system performs a lookup in the thread's private buffer based on the address of the memory reference to locate a corresponding address for a store-marked cache line. If the private buffer contains a corresponding address, the thread proceeds with the store operation (step 538) and clears the store requested flag if it is set.

If, however, the private buffer does not contain a matching address, the thread concludes that it has not set the store-mark. If the thread has not set the store-mark, the system determines whether the cache line has been store-marked or load-marked by another thread (step 534). During this process, the system first checks in the thread's local cache for a copy of the cache line. If the system finds a copy of the cache line, the system examines the store-mark to determine whether the cache line has been store-marked by another thread. If the store-mark in the copy of the cache line is not set, the system determines whether the store-mark has been set in another copy of the cache line which exists in another cache or in memory. If a store-mark is set in either location, the store operation is retried after a delay (step 536). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store operation is retried after a delay (step 536).

Propagating Store-Marks and Load-Marks

In one embodiment of the present invention, the system eventually propagates the load-marks, store-marks, and the store-requested flag in the metadata for a cache line to the other caches and to memory. The following sections explain the process of propagating the load-marks, store-marks, and the store-requested flag. Note that we refer to the combination of load-marks, store-marks, and the store-requested flag together as "metadata" for cases where load-marks, store-marks, and the store-requested flag are propagated in a similar way.

Note that obtaining a copy of the cache line in the proper coherency protocol state (as detailed in the following sections) is just the first step in reading from or writing to a cache line. After the cache line has been obtained in the proper coherency protocol state, the system has to verify that the desired access can be performed and, if necessary, add a load-mark or a store-mark before performing a read or write to the cache line.

Figure 6A:
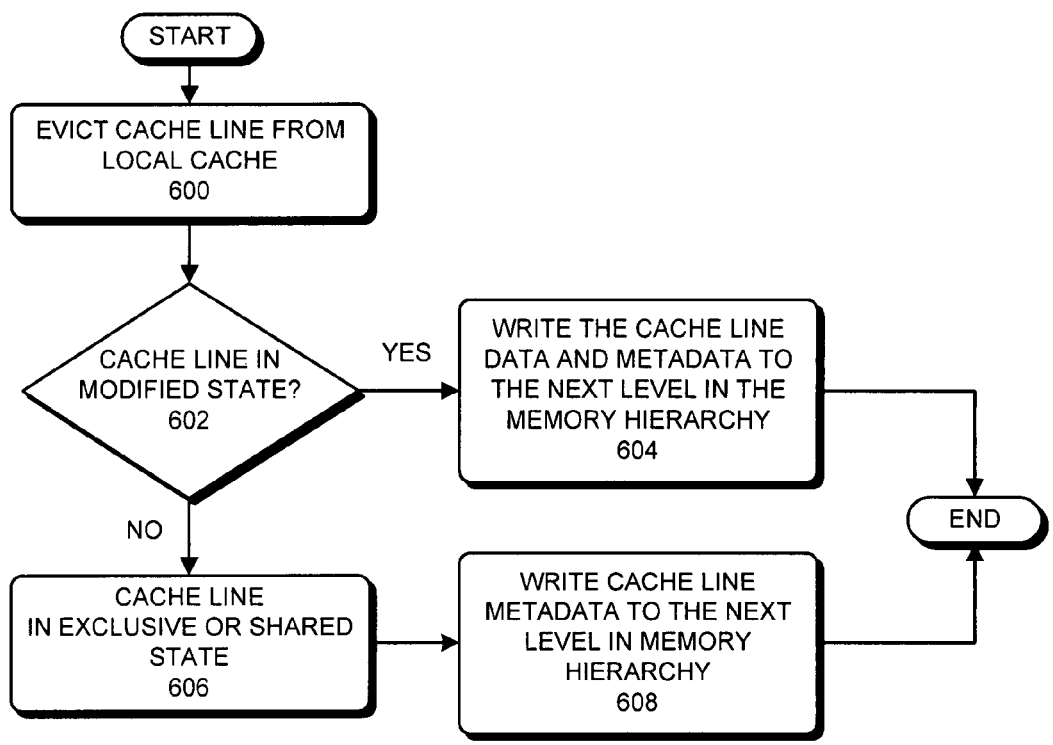
FIG. 6A presents a flowchart illustrating the process of propagating metadata for an evicted cache line in accordance with an embodiment of the present invention.

We first consider the case where a cache line is evicted from a cache as illustrated in FIG. 6A. The process starts when a cache line is evicted from a cache (step 600). The system determines if the cache line is in the modified state (step 602). If so, the system evicts the line by writing the cache line data and the metadata to the next level of the memory hierarchy (step 604).

On the other hand, if the cache line is not in the modified state, but is in the exclusive state or shared state (step 606), the system does not propagate the data in the cache line, but writes the metadata to the next level of the memory hierarchy (step 608).

Figure 6B:
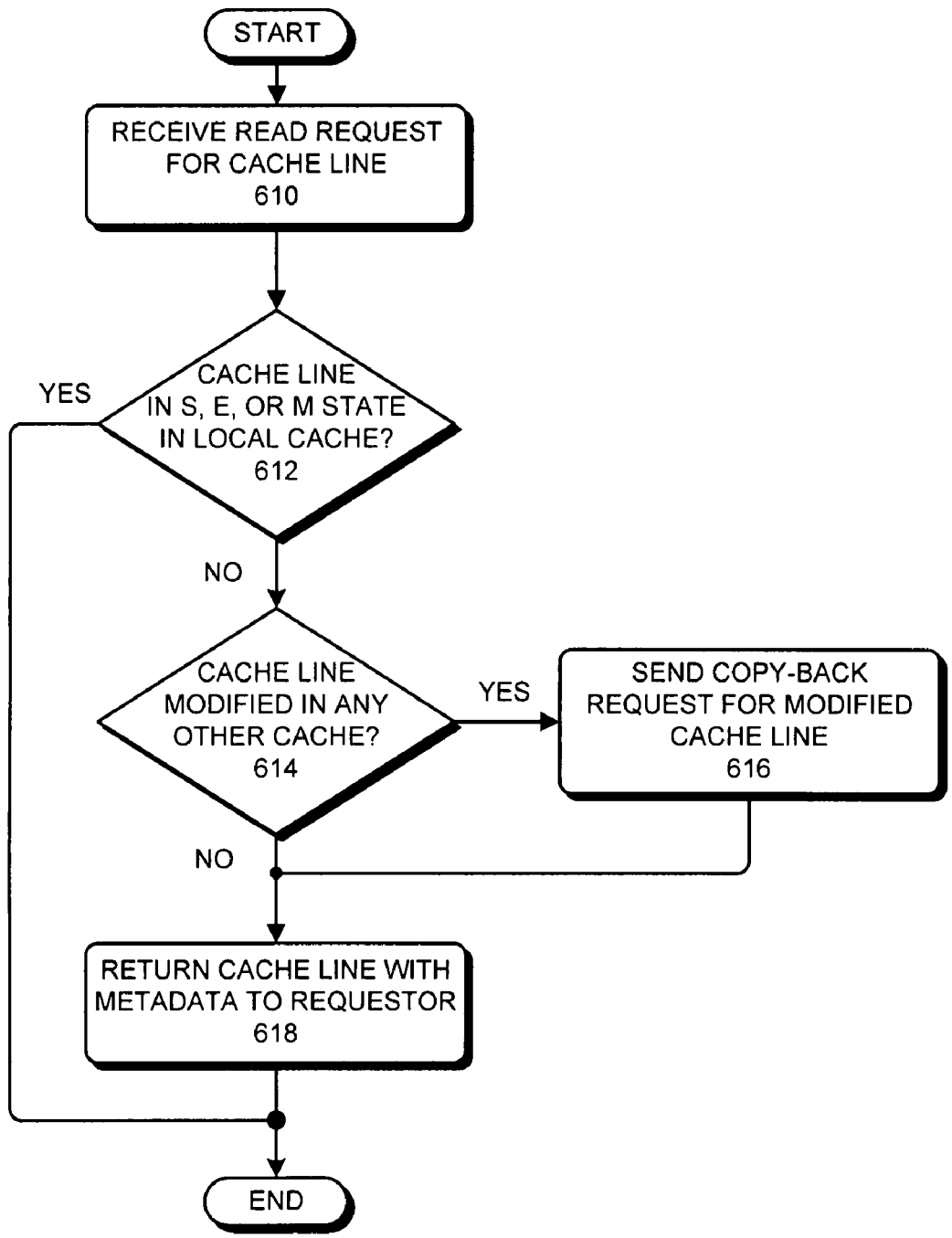
FIG. 6B presents a flowchart illustrating the process of propagating metadata for a cache line during a read operation in accordance with an embodiment of the present invention.

We next consider the case where the cache line is subject to a read operation as illustrated in FIG. 6B. The process starts when the system receives a read request for a cache line (step 610). The system first determines if the cache line is held the shared, exclusive, or modified state the thread's local cache (step 612). If so, the thread can read the local copy of the cache line and the process is complete.

Otherwise, the system determines if the cache line is held in any other processor's cache in the modified state (step 614). If so, the system sends a copyback coherence request to that cache (step 616). Upon receiving a copyback coherence request, the processor that holds the modified copy of the cache line responds with a copy of the cache line and the metadata, which are returned to the requestor (step 618). Note that when responding to the copyback coherence request, the processor that holds the modified copy responds with a copy of the cache line, but also retains a local copy of the cache line in the shared state.

When the processor sends the load-mark in response to a copyback coherence request, the processor can partition the reader count value into two parts and can send part of the reader count value and can retain part of the reader count value. However, the sum of the sent reader count value and the retained reader count value must equal the starting reader count value in the local copy of the cache line. For example, where the reader count value in the local copy of the cache line originally indicated that there were four load marks on the cache line, the processor can send two of the load marks with the sent line, while retaining two of the load marks in the local copy of the cache line.

Figure 6C:
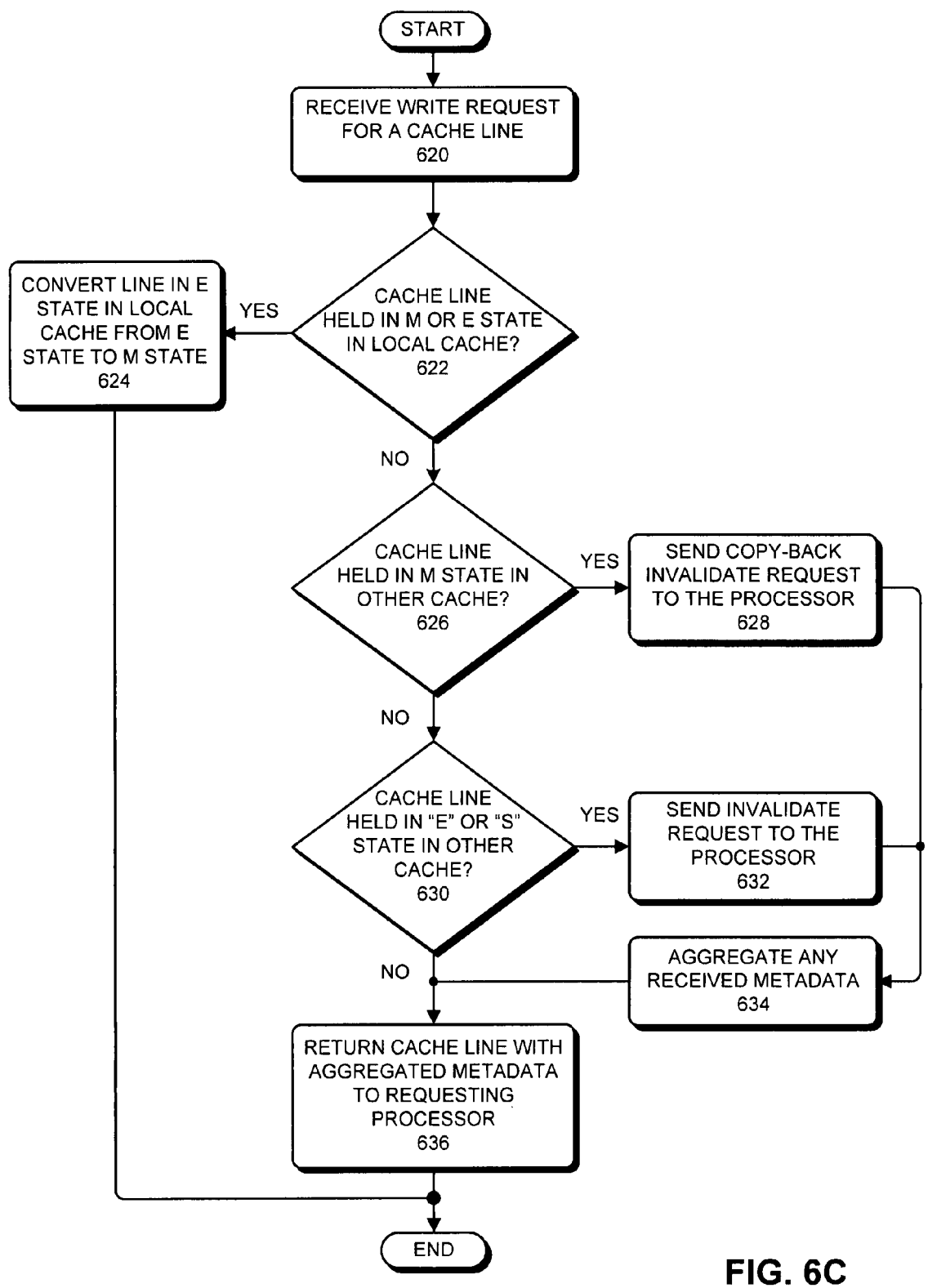
FIG. 6C presents a flowchart illustrating the process of propagating metadata for a cache line during a write operation in accordance with an embodiment of the present invention.

We next consider the case where the cache line is subject to a write request that is illustrated in FIG. 6C. Note that a thread attempting to write to the cache line first obtains a copy of the cache line in the modified state, which invalidates all copies of the line in other caches and obtains the cache line in the modified state for the requesting thread.

The process starts when the system receives a write request for a cache line (step 620). The system first determines if the cache line is held in the local cache in the modified or exclusive state (step 621). If the cache line is held in the modified state, the thread already has write access to the cache line, so the process is complete.

If the cache line is held in the exclusive state, the system can change the status of the copy of the cache line to the modified state (step 634). In order to change the status of the local copy of the cache line from the exclusive state to the modified state, the system implicitly invalidates the copy of the cache line held in the memory system. Hence, for one embodiment of the present invention, whenever a cache line is delivered to a local cache in the exclusive state, the cache line is delivered with reader count equal value to the total number of threads that have put load-marks on the cache line. In other words, when the cache line is delivered, the reader count value in the memory system is zero and all of the load-marks are included in the metadata for the local copy of the cache line. Note that the store-mark is propagated with each copy of the cache line, so no special treatment is required for the store-mark in this embodiment.

If the cache line is held in any other processor's cache in the modified state (step 622), the system sends a copyback-invalidate coherence request to that cache (step 624). Upon receiving the copyback-invalidate coherence request at a given cache that holds the copy of the cache line, the cache line data and metadata are propagated back to memory and the local copy of the given cache line in the given cache is invalidated.

On the other hand, if the system receives a write request for a cache line that is held in any other processor's cache in the exclusive state or the shared state (step 626), the system sends an invalidate coherence request to all other caches in the coherence domain that may contain a valid copy of the cache line (step 628). Upon receiving the invalidate coherence request at a given cache that holds the copy of the cache line, the metadata is propagated back to memory and the local copy of the cache line in the given cache is invalidated.

In addition, the system determines the number of load-marks that are on the copy of the cache line in memory. In one embodiment of the current invention, the system makes the determination by reading the metadata of the cache line in memory.

The system then sums load-marks in the metadata received from the other caches and from memory (step 630) and responds to the requester with a cache line, including the metadata (step 632). Hence, the copy of the line delivered to the requesting thread has a reader count value which is equal to the number of threads that have placed a load-mark on the line and a store-mark that is asserted if any other thread had asserted a local store-mark.

By propagating the metadata as described above, the system maintains the invariant that the sum of the load-marks in all valid copies of a cache line equals the total number of threads that have load-marked the line. Maintaining this invariant prevents a thread from storing to a line on which another thread has placed a load-mark.

Note that the system can use negative, as well as positive, values for reader count values. This can be helpful when a thread wants to remove a load-mark from a cache line that has been evicted from its local cache.

The Store-Requested Flag

Embodiments of the present invention include a store-requested flag in metadata within cache lines. Whenever a thread attempts to store to a cache line, the thread first obtains a writable copy of the cache line (see FIG. 6C). The thread then checks the reader count value in the cache line and determines whether or not the thread can write to the cache line. If the thread cannot write to the cache line because another thread has placed a load-mark on the line, the processor sets the cache line's "store-requested flag." The thread then retries the store after waiting for the other threads to remove their load-marks from the cache line. Whenever a thread stores to a line with the store-requested flag set, the thread clears the store-requested flag.

In this embodiment, threads that want to load from a cache line follow the load-marking protocol, except that a processor is not allowed to place a load-mark on a cache line which has the store-requested flag set. Whenever a cache or memory provides a copy of a cache line, the store-requested flag is provided along with the data as is described with respect to FIGS. 6A-6C.

Note that when a thread sets a store-requested flag on an exclusive copy of the cache line, the cache coherence protocol propagates the store-requested flag to any thread which subsequently attempts to place a load-mark on the line. Also, note that this technique still allows an arbitrary number of threads to share a cache line, provided that no thread is attempting to store to that line. Finally, note that this technique prevents any set of readers (i.e., threads placing load-marks on a cache line) from keeping other threads from writing to a cache line.

Figure 7:
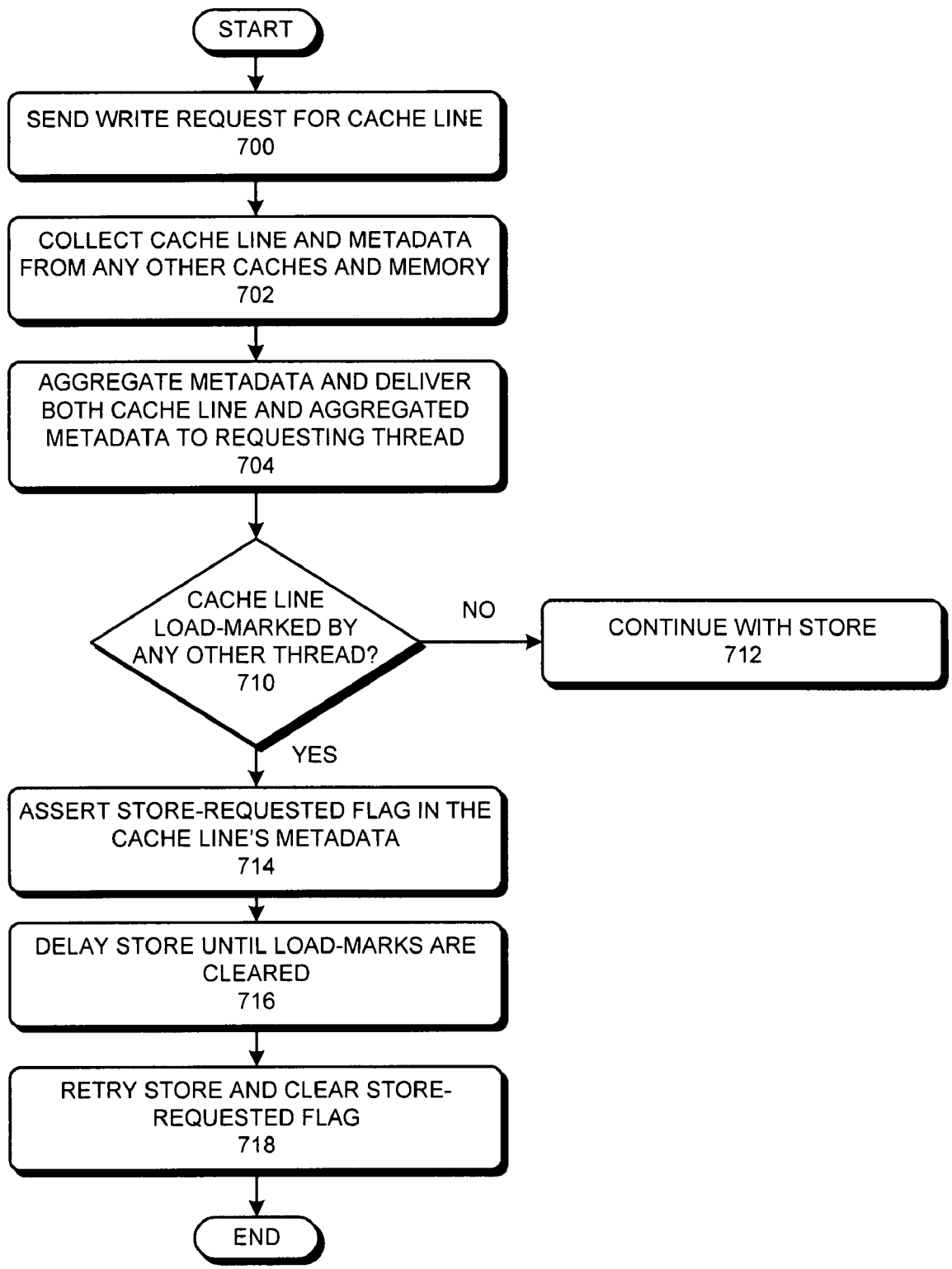
FIG. 7 presents a flowchart that illustrates the process of using a store-requested flag in accordance with an embodiment of the present invention.

FIG. 7 presents a flowchart illustrating the process of using a store-requested flag in accordance with an embodiment of the present invention. The process starts when a thread executes a store instruction to store a value to a cache line (step 700).

When the system receives the store instruction, the system collects any modified copy of the cache line and all metadata from the local caches in the system and from memory (step 702). (The process of collecting the cache line and the metadata for a thread with a store request is described in detail with reference to FIG. 6C.)

The system then aggregates any received metadata by summing any reader count value from the received metadata and by recording if any cache line has the store-requested flag asserted. Next, the system delivers the cache line to the requesting thread in the modified state, including the aggregated metadata (step 704).

The system then loads the cache line into the local cache and checks the reader count value in the cache line's metadata to determine if any other thread has load-marked the cache line (step 710). In order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there are no load-marks from other threads on the cache line, the thread proceeds with the store, which may involve store-marking the cache line (step 712).

On the other hand, if there are load-marks from other threads on the cache line, the thread is prevented from storing to the cache line. In this case, to avoid potential store starvation, the system sets the store-requested flag in the cache line's metadata (step 714).

In an alternative embodiment, the thread does not set the store-requested flag upon initially determining that a cache line has been load-marked, but instead retries the store operation a predetermined number of times before setting the store-requested flag.

The store-requesting thread then delays the store to wait for load-marks on the cache line to be cleared (step 716). Because other threads are not permitted to place additional load-marks on the cache line, the threads that previously placed load-marks on the cache line eventually complete their loads and clear their corresponding load-marks. When all of the load-marks have been cleared from the cache line, the system executes the store and clears the store-requested flag (step 718).

Forward-Progress Mechanism

As described above, the store-requested flag protocol guarantees that at least one thread can store to a cache line before additional threads place load-marks on the line, but the protocol does not guarantee that any specific thread will be able to perform such a store. Hence, specific threads may still experience store starvation. In order to avoid such store starvation, certain embodiments of the present invention include a "forward-progress" mechanism. In these embodiments, a thread that is not making forward progress can assert a signal requesting forward progress. Threads that have requested forward progress are granted the right to make forward progress one at a time in round-robin fashion. While a thread is requesting the right to make forward progress, no other thread can place a load-mark on the cache line (unless that other thread is explicitly granted the right to make forward progress).

Figure 8:
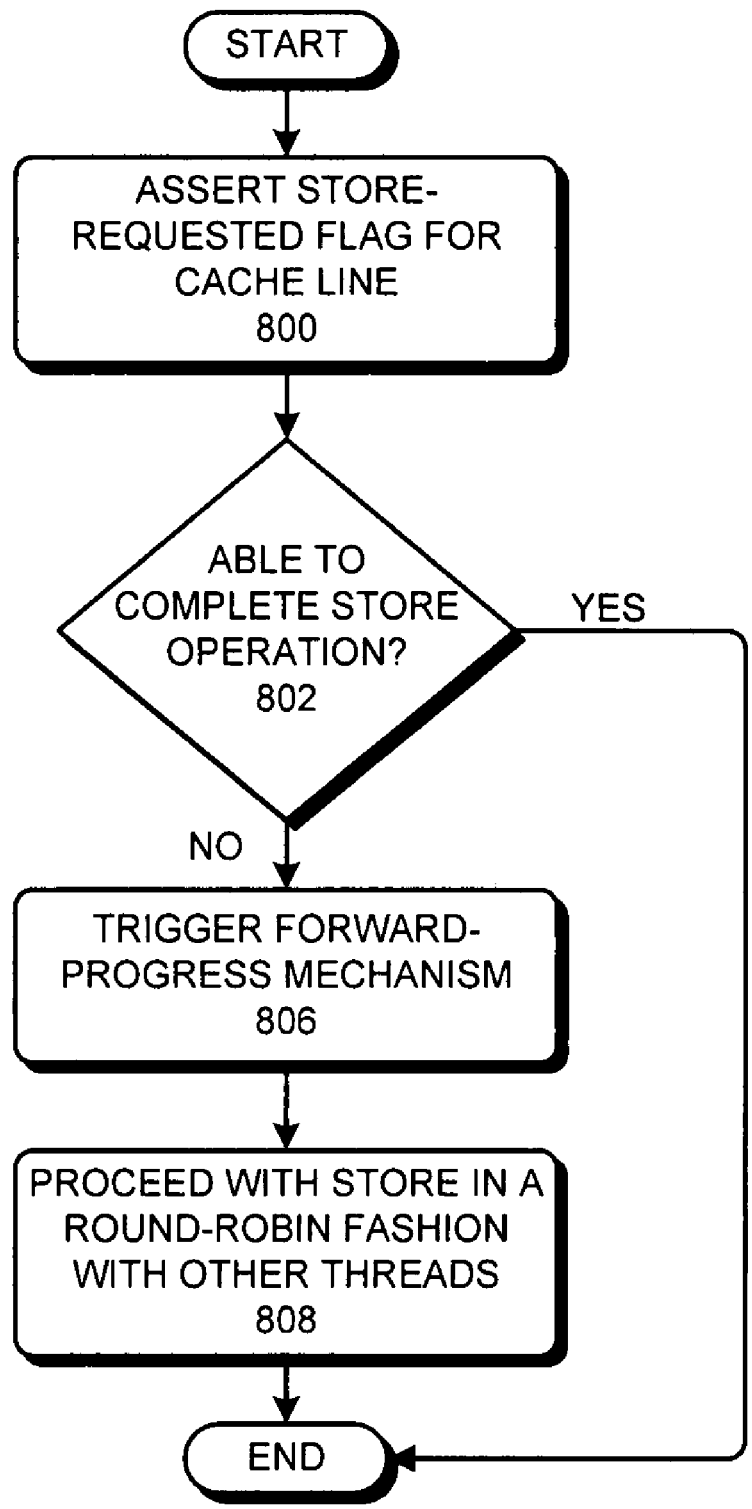
FIG. 8 presents a flowchart that illustrates the process of using a forward-progress mechanism in accordance with an embodiment of the present invention.

FIG. 8 presents a flowchart that illustrates the operation of a forward-progress mechanism in accordance with an embodiment of the present invention. The process starts when the system asserts the store-requested flag in a cache line's metadata on behalf of a thread (step 800). If the store-requesting thread is then able to complete a store operation to the cache line (step 802), the thread has made forward progress and the process is complete.

On the other hand, despite the use of the store-requested flag, the thread may be unable to complete the store operation (step 802). As described in the preceding sections, the store-requested flag can be set by more than one thread (although only the first of such settings actually changes the value of the store requested flag). After the store-requested flag is set, no new load-marks can be placed on the cache line. Therefore, the load-marks are eventually cleared from the cache line. When the load-marks are cleared, the first thread to clear a store-mark or complete a store to the cache line also clears the store requested flag. In other words, another thread can clear the store-requested flag before the thread is able to complete a store operation. Once the store-requested flag has been cleared, load-marks can again be placed on the cache line. Hence, the thread may be unable to perform the store operation (or to store-mark the cache line) and can encounter store-starvation. In such a case, the system triggers the forward progress mechanism on the thread's behalf (step 806).

In an alternative embodiment, the system does not trigger the forward-progress mechanism upon initially determining that thread is unable to complete a store operation, but instead retries the store operation a predetermined number of times before triggering the forward-progress mechanism.

The system then detects that the forward-progress mechanism has been triggered and allows the thread to proceed with the store operation in a round-robin fashion with the other threads (step 808).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for preventing store starvation in a system that supports marked coherence, comprising:

receiving a store instruction to be executed;

determining whether a cache line to which the store is directed is load-marked;

if the cache line is load-marked, delaying the store operation and asserting a store-requested flag in the metadata for the cache line, wherein when the store-requested flag is asserted, no subsequent load-marks can be placed on the cache line; and completing the store operation when all of the load-marks have been removed from the cache line.

2. The method of claim 1, wherein asserting the store-requested flag involves first obtaining a writeable copy of the cache line.

3. The method of claim 1, wherein if a thread is prevented by one or more other threads from completing a store operation after asserting the store-requested flag, the method further comprises using a forward-progress mechanism to allow the thread to proceed with the store operation in a round-robin fashion with the one or more other threads.

4. The method of claim 1, wherein determining whether the cache line to which the store is directed is load-marked involves receiving a copy of the cache line along with metadata associated with the cache line, wherein the metadata includes prior load-marks and the store-requested flag.

5. The method of claim 4, wherein determining whether the cache line to which the store is directed is load-marked involves determining whether at least one other thread has placed a load-mark on the cache line, wherein when such a load-mark has been placed on a cache line, the thread attempting to store to the cache line cannot perform any stores.

6. The method of claim 5, wherein the load-mark is cleared when the at least one other thread that placed the load-mark has completed one or more load operations to the cache line.

7. The method of claim 1, further comprising clearing the store-requested flag when the store operation has completed.

8. The method of claim 1, wherein when another thread attempts to load-mark the cache line, the other thread receives a copy of the cache line along with metadata associated with the cache line wherein the metadata includes the store-requested flag.

9. An apparatus that prevents store starvation in a system that supports marked coherence, comprising:

an execution mechanism configured to receive a store instruction to be executed;

a monitoring mechanism coupled to the execution mechanism, wherein the monitoring mechanism is configured to determine whether a cache line to which the store is directed is load-marked;

if the cache line is load-marked, the execution mechanism is configured to delay the store operation and assert a store-requested flag in the metadata for the cache line, wherein when the store-requested flag is asserted, no subsequent load-marks can be placed on the cache line; and wherein the execution mechanism is configured to complete the store operation when all of the load-marks have been removed from the cache line.

10. The apparatus of claim 9, wherein the execution mechanism is configured to obtain a writeable copy of the cache line before asserting the store-requested flag.

11. The apparatus of claim 9, further comprising a forward-progress mechanism coupled to the execution mechanism, wherein if a thread is prevented by one or more other threads from completing a store operation after asserting the store-requested flag, the forward-progress mechanism is configured to allow the thread to proceed with the store operation in a round-robin fashion with the one or more other threads.

12. The apparatus of claim 9, wherein when determining whether the cache line to which the store is directed is load-marked, the monitoring mechanism is configured to receive a copy of the cache line along with metadata associated with the cache line, wherein the metadata includes prior load-marks and the store-requested flag.

13. The apparatus of claim 12, wherein when determining whether the cache line to which the store is directed is load-marked, the monitoring mechanism is configured to determine whether at least one other thread has placed a load-mark on the cache line, wherein when such a load-mark has been placed on a cache line, a thread attempting to store to the cache line cannot perform any stores.

14. The apparatus of claim 13, wherein the execution mechanism is configured to clear a load-mark when the at least one other thread that placed the load-mark has completed one or more load operations to the cache line.

15. The apparatus of claim 9, wherein the execution mechanism is configured to clear the store-requested flag when the store operation has completed.

16. The apparatus of claim 9, further comprising a propagating mechanism that propagates a copy of the cache line along with metadata associated with the cache line to threads that attempt to load-mark the cache line, wherein the metadata includes the store-requested flag.

17. A computer system that prevents store starvation in a system that supports marked coherence, comprising:
a processor;
an execution mechanism on the processor, wherein the execution mechanism is configured to receive a store instruction to be executed;
a cache memory coupled to the processor, wherein the cache memory is configured to store data and instructions for the execution mechanism in a number of cache lines;
a monitoring mechanism coupled to the processor and to the cache memory, wherein the monitoring mechanism is configured to determine whether a cache line to which the store is directed is load-marked;
if the cache line is load-marked, the execution mechanism is configured to delay the store operation and assert a store-requested flag in the metadata for the cache line, wherein when the store-requested flag is asserted, no subsequent load-marks can be placed on the cache line; and
wherein the execution mechanism is configured to complete the store operation when all of the load-marks have been removed from the cache line.

18. The computer system of claim 17, wherein the execution mechanism is configured to obtaining a writeable copy of the cache line before asserting the store-requested flag.

19. The computer system of claim 17, further comprising a forward-progress mechanism coupled to the execution mechanism, wherein if a thread is prevented by one or more other threads from completing a store operation after asserting the store-requested flag, the forward-progress mechanism is configured to allow the thread to proceed with a store operation in a round-robin fashion with the one or more other threads.

20. The computer system of claim 17, wherein when determining whether the cache line to which the store is directed is load-marked, the monitoring mechanism is configured to receive a copy of the cache line along with metadata associated with the cache line, wherein the metadata includes prior load-marks and the store-requested flag.

21. The computer system of claim 20, wherein when determining whether the cache line to which the store is directed is load-marked, the monitoring mechanism is configured to determine whether at least one other thread has placed a load-mark on the cache line, wherein when such a load-mark has been placed on a cache line, a thread attempting to store to the cache line cannot perform any stores.

22. The computer system of claim 21, wherein the execution mechanism is configured to clear a load-mark when the at least one thread that placed the load-mark has completed one or more load operations to the cache line.

23. The computer system of claim 17, wherein the execution mechanism is configured to clear the store-requested flag when the store operation has completed.

24. The computer system of claim 17, further comprising a propagating mechanism that propagates a copy of the cache line along with metadata associated with the cache line to a thread, that attempts load-mark the cache line, wherein the metadata includes the store-requested flag.

* * * * *

UNITED STATES PATENT AND TRADEMARK OFFICE
CERTIFICATE OF CORRECTION

PATENT NO. : 7,774,552 B1  Page 1 of 1
APPLICATION NO. : 11/700703
DATED : August 10, 2010
INVENTOR(S) : Robert E. Cypher et al.

It is certified that error appears in the above-identified patent and that said Letters Patent is hereby corrected as shown below:

In claim 5 (at column 14, line 26), please replace the word "the" with the word --a-- so that the line reads: load-mark has been placed on a cache line, a thread attempt-.

In claim 8 (at column 14, line 36), please insert a --,-- after the word "line" so that the line reads: the cache line, wherein the metadata includes the store-re-.

In claim 16 (at column 15, line 20), please replace the words "line to threads" with the words --line to a thread-- so that the line reads: along with metadata associated with the cache line to a thread.

In claim 16 (at column 15, line 21), please replace the word "attempt" with the word --attempts--.

Signed and Sealed this

Thirtieth Day of November, 2010

David J. Kappos
*Director of the United States Patent and Trademark Office*